N. WILLIAMS.
GATE.
APPLICATION FILED JAN. 16, 1913.
1,083,475.
Patented Jan. 6, 1914.
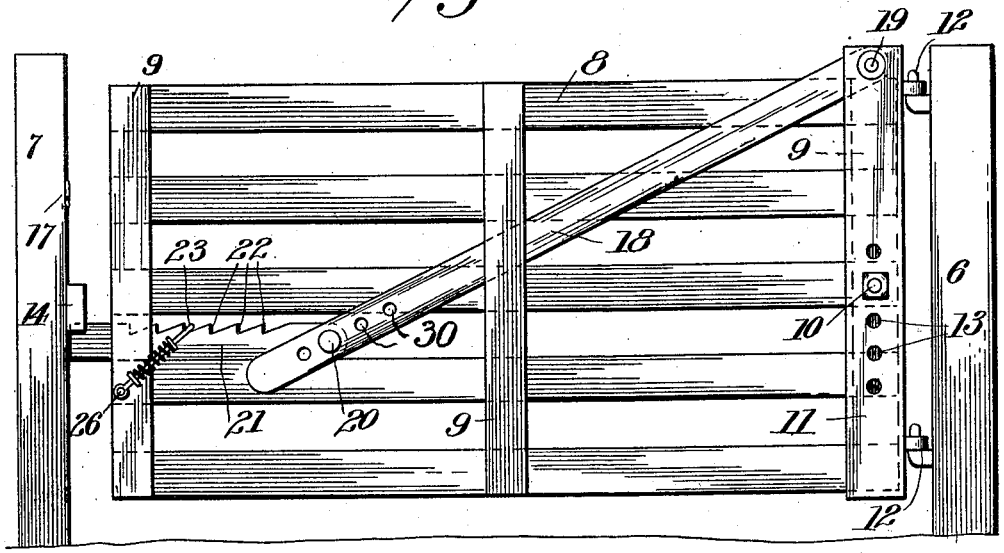
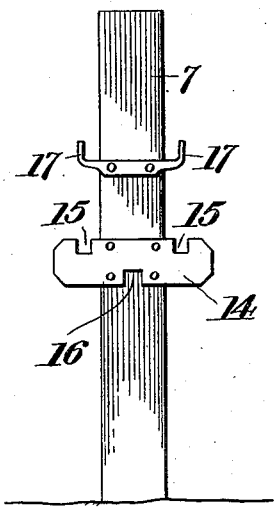
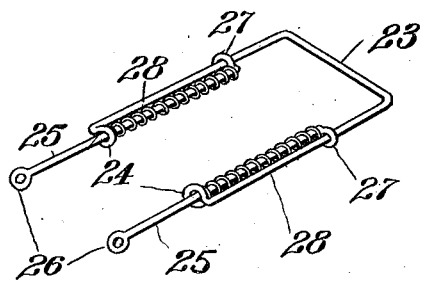
WITNESSES
Nathaniel Williams
INVENTOR
Attorney

UNITED STATES PATENT OFFICE.

NATHANIEL WILLIAMS, OF OWOSSO, MICHIGAN.

GATE.

1,083,475.  Specification of Letters Patent.  Patented Jan. 6, 1914.

Application filed January 16, 1913. Serial No. 742,467.

*To all whom it may concern:*

Be it known that I, NATHANIEL WILLIAMS, a citizen of the United States, residing at Owosso, in the county of Shiawassee and State of Michigan, have invented certain new and useful Improvements in Gates, of which the following is a specification.

This invention relates to gates, especially to swinging gates of that type having a pivoted panel which can be raised or lowered, and which when raised will allow the passage thereunder of small animals. The gate is particularly adapted for farm use.

The object of the invention is to provide a gate of the kind stated with improved means for supporting and holding the same in position, and for connecting the tilting panel to the gate post. The various parts of the panel are not movable relative to each other, but the whole panel is rigidly constructed and may be tilted as a whole, being supported by an upright hinged to the post, and a brace connecting the top of said upright with the free end of the gate.

The invention is illustrated in the accompanying drawings in which—

Figure 1 is a side elevation of the gate. Fig. 2 is an inner side view of the end gate post, to which the gate is latched. Fig. 3 is a perspective view of a catch.

Referring specifically to the drawings, 6 indicates the post to which the gate is hinged, and 7 the latch post at the opposite side of the gateway. The gate panel has horizontal rails 8, and upright bars 9 bolted or otherwise firmly fastened to the rails. The panel may be otherwise constructed if desired. At the hanging end it is pivoted by a bolt 10 to an upright bar 11 which is connected by hinges 12 to the post 6. The panel as a whole can tilt on the single pivot bolt 10 by which it is attached to the bar 11, and it may be adjusted to various heights by putting the bolt in any one of the several holes 13 in the bar.

The post 7 has a keeper consisting of a cross piece 14 fastened thereto, with notches 15 in the upper edge, on opposite sides of the post, and a lower notch 16 on the underside. The post also has hooks or keepers 17, on opposite sides thereof, above the keeper 14.

The free end of the panel is supported by a diagonal brace 18, which is pivoted at its upper end by a bolt 19 to the top of the bar 11, and at its lower end is pivotally bolted at 20 to the inner end of a sliding bar 21 which conveniently rides or is movable along one of the rails 8 and works at its outer end between the bars 9 at the free end of the gate. This sliding bar 21 has in its upper edge a series of notches 22 adapted to be caught by the bend of the catch shown in Fig. 3. This catch consists of a U bar 23 with eyes 24 at its opposite ends, and rods 25 which work through said eyes, said rods being pivoted at 26 to the bars 9 on opposite sides of the gate. Each rod 25 has an eye 27 through which works one of the branches of the U-shaped rod 23, and a spring 28 is coiled around each rod 25 between the eyes 24 and 27. This forms a yielding catch for engagement with the lock bar 21, and the purpose of the springs 28 is to help support the weight of the panel. The springs are made sufficiently strong to just about balance the weight of the outer end of the gate. Preferably they will be made sufficiently strong to lift the free end of the gate from a low position to an intermediate position, but when the tension of the springs is decreased by lifting the gate above said intermediate position, the springs will then permit the gate to drop to said intermediate position.

The outer end of the catch bar 21 may be engaged in the notch 16, either notch 15, or either hook 17.

When the panel is tilted on its pivot 10, the latch bar 21 will slide in or out, as the panel is lowered or raised. The parts are so proportioned and located, and the springs 24 are of such strength that they will normally lift the outer end of the panel and the end of the catch bar 21 will catch in the notch 16. Then, to open the gate, it is pressed down with sufficient force to disengage the catch bar from the notch, and may then be swung open in either direction. If it be desired to raise the gate somewhat, and hold it closed in that position, the panel is lifted, which will cause the catch bar 21 to slide outwardly to a sufficient distance to catch its end in one of the notches 15, the strength of the springs being such that the weight of the panel will slightly overbalance the same at that height. To hold the gate in still higher position the panel is tilted upwardly and the catch bar 21 may then be caught over either one of the hooks 17. The notches 22 permit an adjustment of the catch to give the desired tension on the springs and the holes 30 in the brace bar 18 permit further adjustment of the connection between the brace and the catch bar. The notches also permit the gate to be set and held at any height desired, by changing the latch 23 from one notch to another. Thus the gate may be used on side hills, and kept off the ground in all positions. But if desired it can be dropped to the ground in either open or closed position by lifting the catch 23 and allowing the panel to swing down. When open, it can be dropped to the ground and thus held open in any position desired.

What I claim as new is:

1. The combination of gate posts, an upright hinged to one of said posts, a keeper on the other post, a panel pivoted to the upright to tilt vertically, a brace bar connected to the upright, a catch bar connected to the brace bar and adapted to project at the free end of the panel and engage the underside of the keeper, and a spring connected between the catch bar and panel and tending to tilt the latter to engage the catch bar with the keeper.

2. The combination of a post, an upright hinged thereto, a panel pivoted to the upright to swing vertically, a diagonal brace bar connected at its upper end to the panel, a sliding catch bar mounted on the panel and connected to the lower end of the brace bar, and having a series of notches in its upper edge, and a catch pivoted to the panel, and engageable in any one of the notches.

3. The combination of a post, an upright hinged thereto, a panel pivoted to the upright to swing vertically, a diagonal brace bar connected at its upper end to the panel, a sliding latch bar mounted on the panel and connected to the lower end of the brace bar, and having a series of notches in its upper edge, and a catch pivoted to the panel, and engageable in any one of the notches, said catch comprising separate members and a spring between the same.

4. The combination of an upright, a panel pivoted thereto to swing vertically, a brace connected at one end to the upright, a sliding latch bar mounted on the panel and connected to the other end of the brace and provided with a series of notches, and a catch pivoted to the panel and engageable with any one of the notches, said catch including a spring acting to support the weight of the free end of the panel when the latch is engaged.

5. The combination of gate posts, an upright hinged to one of said posts, upper and lower keepers on the other post, a panel pivoted to the upright to tilt vertically, a brace bar connected to the upright, a latch bar connected to the brace bar and slidable on the panel and adapted to slide outwardly and project at the free end of the panel and engage either keeper when the panel is tilted up, and adapted to slide inwardly to pass the gate post when the panel is tilted down.

6. The combination of a swinging gate having an upright at the hanging end thereof and a panel pivoted to said upright to swing vertically, a brace connected to said upright, an end gate post having a keeper and a latch bar slidable on the panel and connected to the brace and adapted to project and engage the keeper when the panel is tilted up and to retract and pass the said gate post when the panel is tilted down.

In testimony whereof, I affix my signature in presence of two witnesses.

NATHANIEL WILLIAMS.

Witnesses:
  Moses De Long, Jr.,
  Frank R. Forster.

---

Copies of this patent may be obtained for five cents each, by addressing the "Commissioner of Patents, Washington, D. C."